E. KUND.
DRIVING DEVICE FOR AGRICULTURAL MACHINES.
APPLICATION FILED SEPT. 5, 1913.
1,083,935.
Patented Jan. 13, 1914.
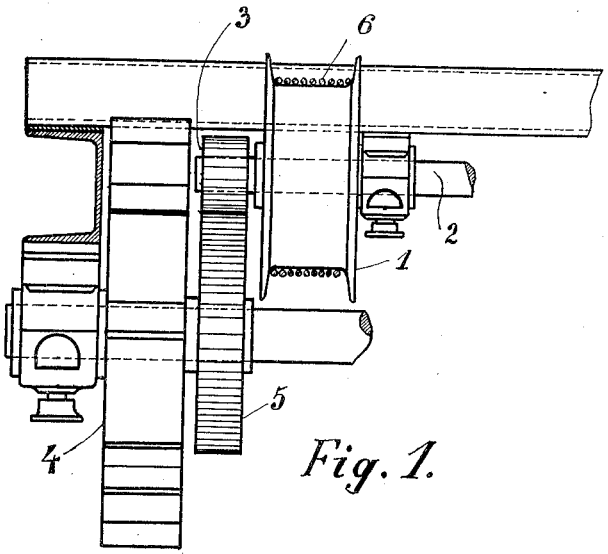
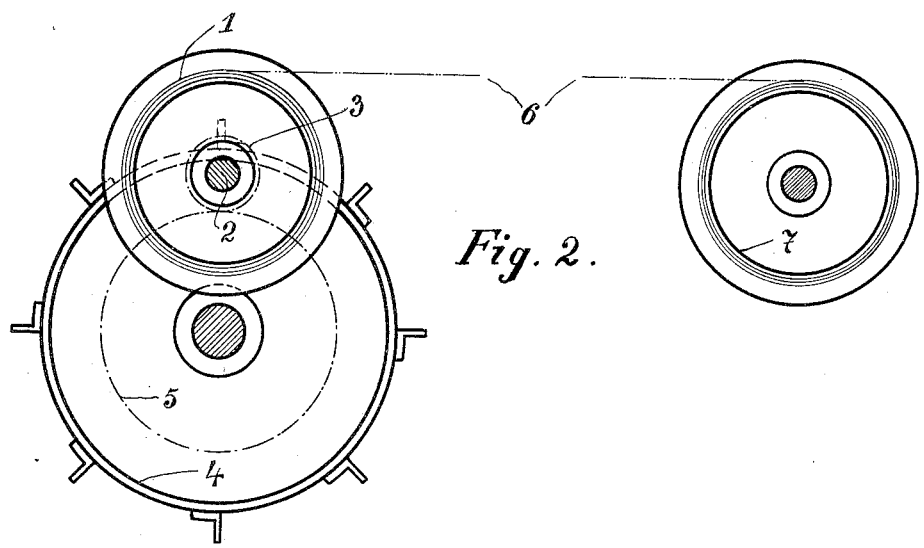
WITNESSES:
INVENTOR,
Edward Kund,
by W. H. Berrigan,
ATTY.

UNITED STATES PATENT OFFICE.

EDWARD KUND, OF DEBRECZEN, AUSTRIA-HUNGARY.

DRIVING DEVICE FOR AGRICULTURAL MACHINES.

1,083,935. Specification of Letters Patent. Patented Jan. 13, 1914.

Application filed September 5, 1913. Serial No. 788,281.

*To all whom it may concern:*

Be it known that I, EDWARD KUND, a subject of the King of Hungary, residing at Debreczen, Austria-Hungary, have invented a new and useful Improved Driving Device for Agricultural Machines; and I do hereby declare the following to be a full, clear, and exact description of the same.

This invention relates to a device for driving portable agricultural machines away from the engine driving the same.

A construction according to this invention is diagrammatically illustrated in the accompanying drawing, in which—

Figure 1 is a front elevation, and Fig. 2 a side elevation.

To the agricultural machine, for instance to a ground cultivating machine, is secured a drum 1 connected to the traveling wheel 4 of the machine, so that the rotation of the drum is transmitted to the traveling wheel, or the movement of the latter is transmitted to the drum. To that end, the drum is secured for instance to a spindle 2 which, by means of a toothed wheel 3 secured to it, is connected to a wheel 5 secured to the axle of the traveling wheel. The traveling wheels are provided with projections.

Around the drum 1 is wound a wire cable 6 or the like, the other end of which is carried around a drum 7 secured to the engine and driven by the latter. If the cable 6 is wound by the engine on its own drum 7, and unwound from the drum 1 of the agricultural machine, the drum 1 will be rotated and drive the traveling wheel of the agricultural machine, so that the latter will move.

The transmission gear inserted between the traveling wheels and the drum of the agricultural machine, can be of any desired construction, for instance a chain wheel, friction wheel, belt pulley or the like transmission, and therefore it need not be absolutely a gear wheel transmission. The rate of transmission is preferably calculated so that the drum has a greater speed of rotation, or circumferential speed, than the traveling wheels, as in that way a better efficiency is obtained, and the advance is insured even in case of unfavorable ground. The transmission is preferably arranged in such manner that it can be changed, and further so that the traveling wheels can be disconnected from the drum.

The device described can be applied in many cases in agricultural working, but four different examples of application will be hereinafter described.

1. The drum 1 and the transmission to the traveling wheels are secured to a multiple share plow working on one side. The engine is provided with two cable drums. By means of one drum which is preferably running slower, the plow is drawn by the engine directly toward itself, the plow cultivating the ground during that time, while by means of the other drum, preferably running at a greater speed, the cable is unwound from the drum 1 and drawn in, whereby the plow, the shares of which have been lifted up, is moved away from the engine with the greatest possible speed.

2. To each of two plows, one of which works to the right and the other to the left, is secured a drum with the corresponding drum leading to the traveling wheels. The engine is provided with two cable drums for each plow, that is to say, altogether four, and is mounted in the middle of the field to be plowed. The engine works so that while it pulls the plow direct toward itself on one side, the other plow, with the shares raised, is moved by the new device away from the engine, preferably with a greater speed, in order to avoid the disturbance of working, which is otherwise caused at the end of the single operations by the lowering and raising of the plow shares.

3. The new device is mounted on a balance or oscillating plow, and the engine is provided with two drums. The engine draws the plow direct toward itself by means of a preferably slowly rotating drum, while by means of another drum rotating preferably with a greater speed, it winds the cable unwound from the drum of the plow, whereby the raised plow is moved away from the engine.

4. The new device is mounted on a balance or oscillating plow in two constructions, and the plow is moved by two engines arranged at both sides of the plow, each of the engines being provided with two cable drums. The plow is reciprocated by the engine so that, while one engine draws the plow direct toward itself, the other engine has the tendency to move the plow away from itself by means of the new device, and thus assists the action of the first engine.

The new device could be used in any desired portable agricultural machines, such as harvesters, sowing machines, beetroot digging machines, rotating ground cultivating machines, etc., for driving the same away from the engine.

Having thus fully described and illustrated my invention, what I claim is:—

1. A device for driving agricultural machines, comprising a drum driven by the engine, a drum mounted on the agricultural machine, a cable transmitting motion from the first mentioned drum to the last mentioned drum, traveling wheels on the agricultural machine, and gearing connecting the last mentioned drum to the traveling wheels, so that by unwinding the cable from the drum mounted on the machine the traveling wheels are rotated in a direction causing them to travel away from the engine.

2. A device for driving agricultural machines by power, comprising drums driven by power, cable drums mounted on the agricultural machine, cables transmitting motion from the power driven drums to the cable drums, traveling wheels on the agricultural machine, gearing transmitting rotation from the cable drums to the traveling wheels, so that by unwinding the cable from one of the drums mounted on the machine the traveling wheels are rotated in a direction causing them to travel away from the power driven device.

In testimony whereof I have signed my name to this specification in the presence of two subscribing witnesses.

EDWARD KUND.

Witnesses:
ERNEST MELLER,
JOHN J. RONTO.

---

Copies of this patent may be obtained for five cents each, by addressing the "Commissioner of Patents, Washington, D. C."